March 30, 1943.  H. W. KOST  2,315,211
FASTENER FOR MOLDINGS OR THE LIKE
Filed April 10, 1941  2 Sheets-Sheet 1
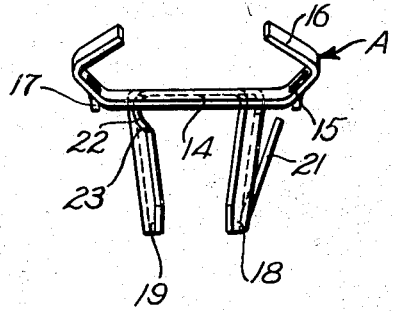
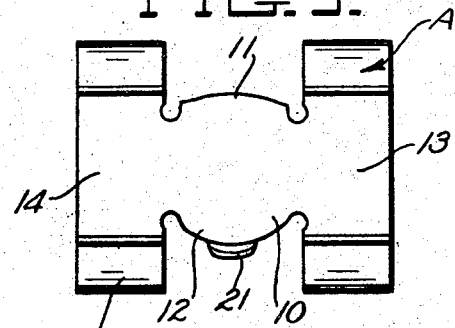
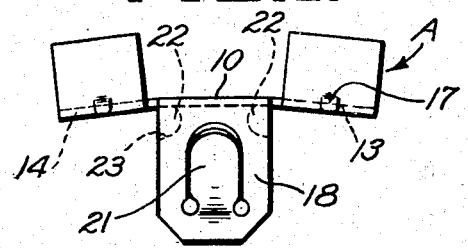
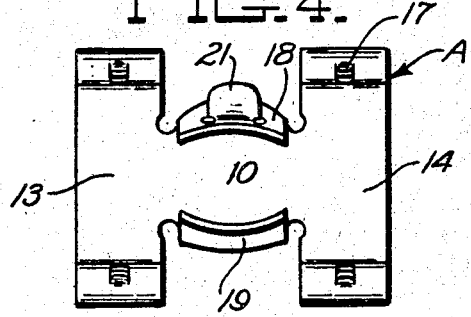
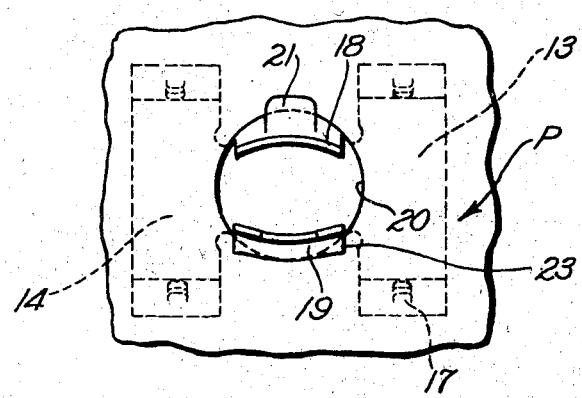
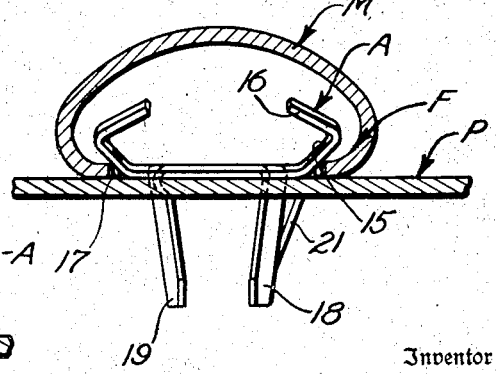
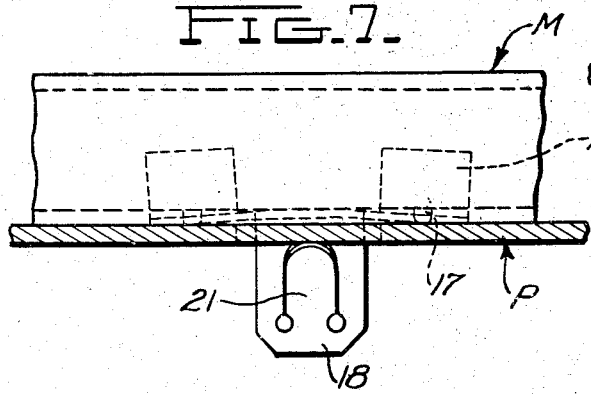
Inventor
Harold W. Kost
By
Attorney March 30, 1943.　　　　H. W. KOST　　　　2,315,211
FASTENER FOR MOLDINGS OR THE LIKE
Filed April 10, 1941　　　2 Sheets-Sheet 2

Inventor
HAROLD W. KOST
By Malcolm W. Fraser
Attorney

Patented Mar. 30, 1943

2,315,211

UNITED STATES PATENT OFFICE 2,315,211

FASTENER FOR MOLDINGS OR THE LIKE

Harold W. Kost, Birmingham, Mich., assignor to Detroit Harvester Company, Detroit, Mich., a corporation of Michigan Application April 10, 1941, Serial No. 387,900

17 Claims. (Cl. 85—5)

This application is a continuation in part of my application Serial No. 289,321, filed August 9, 1939, and since abandoned in favor of this application.

This invention relates to fastening devices but more particularly, although not exclusively, to a fastener for attaching ornamental moldings to vehicle bodies.

An object of this invention is to produce a fastener of the above character which can be readily and conveniently inserted into an opening of a part to be joined by a straight line motion, means being provided for securely holding the fastener against withdrawal but such means being so constructed and arranged as not to interfere materially with the insertion of the fastener.

Another object of the invention is to provide a fastener which can be inserted into an aperture and which will substantially seal the aperture, stop means being associated with the fastener to militate against retrograde movement or withdrawal of the fastener from the aperture.

A further object is to produce a fastener for ornamental moldings or the like which can be readily inserted into an opening in a vehicle part and securely held in place, means being provided to receive and securely hold the molding in position and militate against its disengagement.

A still further object is to produce a new and improved fastener which can be assembled by a straight line motion with respect to an aperture in the vehicle part, means operating automatically to retain the fastener in place relative to the aperture and attaching means being formed on the fastener to receive the molding which can be applied readily and conveniently but after being applied, disengagement is prevented.

Other objects and advantages of the invention will hereinafter appear and for purposes of illustration but not of limitation, an embodiment of the invention is shown on the accompanying drawings in which Figure 1 is an enlarged end view of the fastener;

Figure 2 is a side elevation of the fastener;

Figure 3 is a top plan view of the fastener;

Figure 4 is a bottom plan view of the fastener;

Figure 5 is a sectional elevation of the fastener and molding assembly;

Figure 6 is a bottom plan view of the structure shown on Figure 5;

Figure 7 is a fragmentary side elevation of the assembly shown on Figures 5 and 6;

Figure 8:
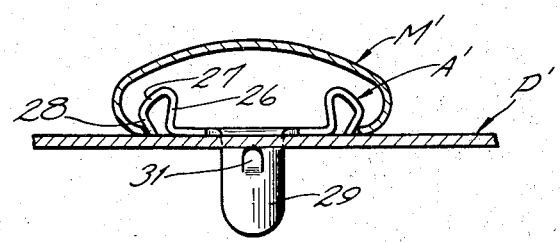
Figure 8 is a sectional view showing an alternate form of fastener mounted on a supporting panel and securing a molding thereto.

The illustrated embodiment of the invention comprises a fastener preferably formed of spring metal having a body portion 10 formed with curvilinear side edges 11 and 12. Integral with the body portion 10 and extending laterally therefrom is a pair of extensions 13 and 14, which, as indicated on Figure 2, incline downwardly with respect to the body portion 10. It will thus be apparent that the extensions 13 and 14 form with the portion 10 an arched body portion, the purpose for which will hereinafter be explained. As indicated on Figure 1, the extensions 13 and 14 project laterally slightly beyond the side edges 11 and 12 of the body portion 10. Integral with each side edge of the extensions 13 and 14 is an arm A, each arm A being formed with an outwardly and upwardly inclined portion 15 which is integrally joined at its outer end to an inwardly and upwardly inclined arm portion 16. It will be apparent that the fastener is formed with four arms A, the arms on each side being in alignment with each other and the arms being spaced laterally from the side edge portions of the body portion 10.

The arms A are adapted to receive and retain a molding strip M which, as shown on Figure 5, may be in the form of an arched body having laterally spaced inturned flange portions F. As will hereinafter appear, the fastener is secured to a panel P and the molding M is secured to the arms A in the following manner: The molding is inclined in such manner as to enable one of the inturned flanges F to engage beneath the outwardly inclined arm portions 15, the opposite side of the flange abutting against the panel P. Thereafter, the molding may be rocked so that the opposite flange F slides over the inwardly inclined arm portions 16 of the opposite pair of arms and then is snapped beneath the adjacent outwardly inclined arm portions 15. It will be obvious that the arms A are resilient and flex sufficiently to afford this assembling operation. Although in the fastener as shown, engagement of the molding M with the fastener is effected by a rocking motion, it will be apparent that by rendering the arm portions sufficiently flexible or slightly changing the angularity of the arm portions, the molding can be readily applied by a straight line motion in which the molding is pushed down upon the fastener causing the arms to flex inwardly and then resiliently return to engaging position.

Stop means is provided to resist any tendency of the molding M to be rocked away from the arms A and for this purpose a tongue 17 is struck out of each of the outwardly inclined arm portions 15 with the free end thereof extending downwardly toward the panel P. It will be apparent that the tongues 17 do not interfere materially with the application of the molding to the fastener but are extremely effective in preventing the molding from becoming disengaged from the fastener. In the unflexed or arched condition of the fastener, the tongues 17 rest upon the surface of the panel P. However, after the fastener is forced into engagement with the panel P, as will hereinafter appear, and the body portion of the fastener is forced toward the panel P somewhat flattening out the camber, the teeth 17 then impinge upon the surface of the panel P, thereby militating against the molding M, even in cases where the molding is formed of exceeding thin material, from slipping over the fastener and thus becoming partially disengaged therefrom.

Arranged between the body extensions 13 and 14 and integral with the body portion 10 is a pair of legs 18 and 19. The legs are bent at substantially right angles to the body portion and as shown on Figure 1, they converge toward their outer or free ends. As shown on Figure 4, the legs are curvilinear through their length transversely thereof. Thus, when the legs are inserted into an aperture 20 in the panel P, the upper ends thereof or those portions close to the body portion 10, are adapted to fit snugly against the walls of the aperture and since the body portion 10 is of a size substantially to cover the opening 20, it will be apparent that the latter is substantially sealed. This is of particular importance in connection with the mounting of moldings on vehicle bodies since it is important to provide a substantial water seal between these parts.

Struck out of the leg 18 is a tongue 21, the lower end of which is integral with the leg and the upper end of which inclines outwardly therefrom. The tongue 21 provides a stop to resist withdrawal or disengagement of the fastener from the aperture 20. It will be obvious that the tongue is so constructed and arranged that by straight line motion, the fastener can be inserted into the opening 20, the tongue flexing substantially into alignment with the leg to permit the insertion but after the leg 18 has been inserted a sufficient distance, the tongue 21 snaps outwardly to engage the under side of the panel P. Additional means is provided to militate against withdrawal of the fastener from the opening and for this purpose, the leg 19 is formed with cutouts 22 on opposite sides as shown on Figure 2. The cut-outs 22 provide shoulders 23 which slightly overlap the edge of the opening 20 in the panel on the under side thereof and thus afford positive stops to prevent retrograde movement. From the above it will be manifest that the leg 19 is much more flexible than the leg 18 in view of the reduced neck formed by the cutouts 22. Thus the leg 18 is relatively rigid but the top tongue 21 struck out from that leg is quite flexible and not only serves as a stop as above explained, but also enables the fastener to accommodate itself to slight variations in the diameter of the hole 20.

From the above description, it will be apparent that I have produced an extremely simple and inexpensive fastener which can be applied to a panel by a straight line motion and securely held in place against disengagement. An important feature of the invention resides in effecting a substantially water-tight seal as above explained. After the fastener is in position, it will be manifest that the molding can be readily and conveniently snapped into position and securely held against disengagement. By forming the body portion of the fastener with a camber or in an arched manner, it will be apparent that when the legs 18 and 19 are inserted through the opening 20 of the supporting panel, a limited amount of flexing is afforded, thereby insuring that the shoulders 23 and tongue 21 will engage the under side of the panel thereby holding the parts securely in position and effectively militating against rattles. It will be manifest that arching of the fastener body in this manner also enables the fastener automatically to accommodate itself for varying thicknesses of the supporting panel and insure the desired engagement of the tongues 21 and stop shoulders 23.

Figure 9:
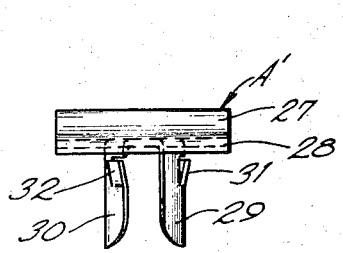
Figure 9 is a side elevation of the fastener shown on Figure 8.
Figure 10:
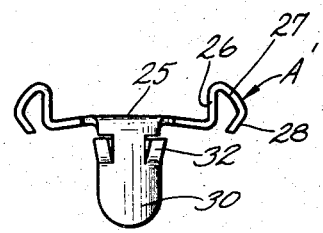
Figure 10 is an end elevation of the fastener shown on Figure 8.
Figure 11:
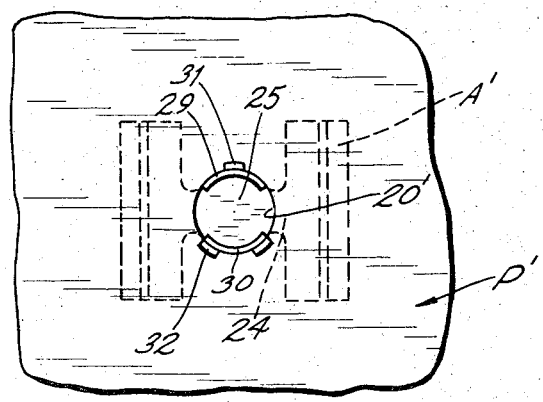
Figure 11 is a bottom plan view of the fastener and molding assembly shown on Figure 8.

In the alternate form of fastener shown on Figures 8 to 12, a single pair of molding engaging arms A' are provided and each of these arms is elongate in a direction longitudinally of the molding strip M', so that the molding strip is gripped or engaged throughout a substantial portion of its length. Each arm is connected by a reduced neck or extension 24 to the body 25 and has an upwardly extending portion 26 disposed at approximately right angles to the body. Inclining downwardly and outwardly from the upper end of the portion 26 is a portion 27 and extending downwardly and inwardly from the lower end of the portion 27 is a portion 28, the free end of which terminates approximately in alignment with the body 25. It will be manifest that the molding M' engages the arms A' as above described and the arms yield to enable the molding to be applied and spring outwardly to retain the molding in position. By arranging the free ends of the molding engaging finger portions on the outer side, somewhat greater flexibility is afforded which contributes to the ease by which the molding strip may be applied.

As in the form hereinbefore described, the body portion and neck or extensions provide an upward camber or arching and the body 25 is shaped to cover the aperture 20' in the supporting panel P' in order to render the assembly reasonably water-proof. Depending from the opposite sides of the body portion 25 and at substantially right angles to the longer dimension of the molding engaging arms A' are legs 29 and 30 which are curvilinear transversely to fit snugly the sides of the panel aperture 20'. These legs are inserted into the panel aperture 20' and the body flattened out to lie approximately flat against the upper surface of the panel P'.

Stops are provided on the legs 29 and 30 for preventing disengagement of the fastener from the panel aperture and, as above described, these stops are so arranged that the legs can be inserted into the aperture by a straight line motion. For this purpose a tongue 31 is struck out of the leg 29 with the free end thereof inclining outwardly therefrom and so arranged that when the body of the fastener is flattened out or at least partly flattened out, the free end of the tongue 31 will engage the under surface of the panel P', the tongue flexing inwardly to prevent insertion of the leg. On the leg 30 is a pair of flexible outwardly inclined tongues 32, one adjacent each side edge of the leg thereby to provide two abutment surfaces for engaging the under side of the panel P'. It will be apparent that the fastener is retained in position by a three-point contact with the under side of the panel.

The above fastener is also formed of one piece from relatively light gauge spring metal and is designed for large volume production.

It is to be understood that numerous changes in details of construction, arrangement and operation may be effected without departing from the spirit of the invention especially as defined in the appended claims.

What I claim is:

1. A fastener of the character described comprising a sheet metal body portion, attaching means on one side of said body portion, a pair of spaced legs integral with said body portion and projecting from the opposite side thereof in converging relation, said legs being adapted to be inserted through an opening in a part to be joined, shoulders formed on one of said legs adjacent the body portion for engaging the edge of the opening on the outer side thereof to form a stop to militate against withdrawal of the fastener, and an integral tongue on the other of said legs having its free end disposed adjacent the body portion and engageable with the outer side of the part to be joined and cooperating to prevent withdrawal of the fastener.

2. A fastener of the character described comprising an arched body portion engageable with and flexible relatively to a part to be joined, attaching means on one side of the body portion, legs disposed intermediately of the body portion and projecting from the opposite side thereof in converging relation, an integral tongue on one leg having its free end disposed adjacent the body portion, said legs being insertible through an opening of the part to be joined and the free end of said tongue being engageable with the outer side of such part for resisting withdrawal of the fastener, and a reduced portion on another leg providing a shoulder engageable with the edge of the opening and cooperating with said tongue for resisting withdrawal of the fastener.

3. A fastener of the character described comprising an arched body portion engageable with and flexible relatively to a part to be joined, attaching means on one side of the body portion, a pair of legs disposed intermediately of the body portion and projecting from the opposite side thereof in converging relation, an integral tongue thereof on one leg having its free end disposed adjacent the body portion, said legs being insertible through an opening of the part to be joined and the free end of said tongue being engageable with the outer side of such part for resisting withdrawal of the fastener, and a reduced portion on the other leg adjacent the body portion providing shoulders engageable with the edge of the opening on the outer side of the part to be joined providing a stop cooperating with said tongue for preventing withdrawal of the fastener.

4. A fastener of the character described comprising a body portion having attaching means thereon, a pair of spaced legs projecting from one side of the body portion and adapted to extend into an opening of a part to be joined, said legs converging toward their free ends and being curvilinear transversely thereof, the inner ends of said legs adjacent the body portion adapted to fit snugly such opening, stop means on said legs constructed and arranged to enable the legs to be inserted freely into the opening but being engageable with the edge of the opening after insertion to resist retrograde movement, said stop means including a tongue struck out of one of said legs with the free end thereof disposed adjacent said body portion, and a shoulder formed on the other of said legs.

5. A fastener of the character described comprising a body portion having attaching means thereon, a pair of spaced legs projecting from one side of the body portion and adapted to extend into an opening of a part to be joined, said legs converging toward their free ends and being curvilinear transversely thereof, the inner ends of said legs adjacent the body portion adapted to fit snugly such opening, and stop means on said legs constructed and arranged to enable the legs to be inserted freely into the opening but being engageable with the edge of the opening after insertion to resist retrograde movement, said stop means including shoulders on one of said legs and a tongue struck out of the other of said legs engageable with the under side of the part to be joined.

6. A fastener of the character described comprising a body portion, a pair of spaced legs projecting from one side of the body portion and adapted to extend into an opening of a part to be joined, said legs converging toward their free ends and being curvilinear transversely thereof, the inner ends of said legs adjacent the body portion adapted to fit snugly such opening, stop means on said legs constructed and arranged to enable the legs to be inserted freely into the opening but being engageable with the edge of the opening after insertion to resist retrograde movement, integral extensions on opposite sides of said body portion, a pair of arms integral with each extension, each arm including a portion inclining outwardly from the extension terminating in an inwardly inclined portion, and an integral tongue on each outwardly inclined portion disposed on the outside thereof and extending in a general direction toward said legs.

7. A fastener for elongate moldings having spaced inturned flange portions, said fastener comprising a body portion, oppositely disposed arms on said body portion, each arm inclining outwardly from said body portion and terminating in an inwardly inclined portion, thereby to enable the molding to be engaged over said arms with the flanged portions disposed beneath said outwardly inclined arm portions, stop means on said outwardly inclined arm portions engageable by the flanged portions of the molding for preventing disengagement thereof, a pair of spaced converging legs depending from said body portion for insertion into an aperture of a part to be joined, said legs being curvilinear transversely thereof and the portions thereof adjacent the body portion being adapted to fit snugly the walls of such aperture, and stop means associated with said legs for militating against retrograde movement of the legs.

8. A fastener for elongate moldings having spaced inturned flange portions, said fastener comprising a body portion, oppositely disposed arms on said body portion, each arm inclining outwardly from said body portion and terminating in an inwardly inclined portion, thereby to enable the molding to be engaged over said arms with the flanged portions disposed beneath said outwardly inclined arm portions, integral tongues struck out of each of said outwardly inclined arm portions to abut the flanged portions of the molding for preventing disengagement thereof, a pair of spaced converging legs depending from said body portion for insertion into an aperture of a part to be joined, said legs being curvilinear transversely thereof and the portions thereof adjacent the body portion being adapted to fit snugly the walls of such aperture, and stop means associated with said legs for militating against retrograde movement of the legs.

9. A fastener for elongate moldings having spaced inturned flange portions, said fastener comprising a body portion, oppositely disposed arms on said body portion, each arm inclining outwardly from said body portion and terminating in an inwardly inclined portion, thereby to enable the molding to be engaged over said arms with the flanged portions disposed beneath said outwardly inclined arm portions, integral tongues struck out of each of said outwardly inclined arm portions to abut the flanged portions of the molding for preventing disengagement thereof, a pair of spaced converging legs depending from said body portion for insertion into an aperture of a part to be joined, said legs being curvilinear transversely thereof and the portions thereof adjacent the body portion being adapted to fit snugly the walls of such aperture, and stop means associated with said legs for militating against retrograde movement of the legs, said stop means including an integral tongue on one leg and shoulders on the other leg engageable with the outer side of the part to be joined for preventing withdrawal of the legs from the aperture.

10. A molding fastener of the character described comprising a body portion, a pair of spaced legs projecting from one side of the body portion and adapted to extend into an opening of a supporting panel, stop means on said legs enabling the legs to be inserted freely into the opening but being engageable with the under side of the panel to resist retrograde movement, integral extensions on opposite sides of said body portion, and oppositely positioned molding engaging arms integral with said extensions, each arm having a portion adjacent the respective extension including in a direction outwardly and upwardly from the extension and the upper portion thereon merging into a portion inclining in a direction inwardly and upwardly relative to the extension.

11. A fastener for elongate moldings having spaced inturned flange portions, said fastener comprising a body portion, oppositely disposed arms on said body portion, each arm having a portion adjacent the body portion inclining in a direction outwardly and upwardly therefrom and the upper portion thereof merging into a portion inclining in a direction inwardly and upwardly relative to the body portion, thereby to enable the molding to be engaged over said arms with the flanged portions disposed beneath said outwardly inclined arm portions, a pair of spaced legs depending from said body portion for insertion into an aperture of a part to be joined, said legs being curvilinear transversely thereof and the portions thereof adjacent the body portion being adapted to fit snugly the walls of such aperture, and stop means associated with said legs for militating against retrograde movement of the legs.

12. A fastener for elongate moldings having spaced inturned flange portions, said fastener comprising an upwardly arched body portion, oppositely disposed arms on said body portion, each arm having a portion adjacent the body portion inclining in a direction outwardly and upwardly therefrom and the upper portion thereof merging into a portion inclining in a direction inwardly and upwardly relative to the body portion, thereby to enable the molding to be engaged over said arms with the flanged portions disposed beneath said outwardly inclined arm portions, a pair of spaced legs depending from said body portion for insertion into an aperture of a part to be joined, said legs being curvilinear transversely thereof and the portions thereof adjacent the body portion being adapted to fit snugly the walls of such aperture, and stop means associated with said legs and engageable with the under side of the part to be joined when the body is substantially flattened against the upper side thereof for militating against retrograde movement of the legs.

13. A fastener for moldings having spaced inwardly extending flanges, said fastener comprising a one-piece member of spring sheet metal having a substantially flat body portion, oppositely disposed attaching fingers extending substantially vertically from said body portion, each finger having an upwardly extending inner portion and a reversely bent outer portion spaced from said inner portion, said outer portion inclining outwardly and thence downwardly and inwardly, said downwardly and inwardly inclined portion impinging upon the adjacent molding flange, and means for securing said body to a supporting panel.

14. A fastener for moldings having spaced inwardly extending flanges, said fastener comprising a one-piece member of spring sheet metal having a body portion adapted to abut substantially flat against a supporting panel, oppositely disposed attaching fingers extending substantially vertically from said body portion, each finger being in the form of an elongate strip, one portion being integral with the body and extending upwardly therefrom and being bent upon itself to provide an outer downwardly extending portion with the free end in the region of said body portion, said outer portion being outwardly bowed with the lower end portion engageable with the adjacent molding flange, and means for securing the fastener to a supporting panel.

15. A fastener for moldings having spaced inwardly extending flanges, said fastener comprising a one-piece member of spring sheet metal having a body portion normally arched but adapted to lie substantially flat in applied position, oppositely disposed attaching fingers extending substantially vertically from said body portion, each finger being in the form of an elongate strip, one portion being integral with the body and extending upwardly therefrom and being bent upon itself to provide an outer downwardly extending portion with the free end in the region of said body portion, said outer portion inclining downwardly and outwardly and terminating in a downwardly and inwardly inclined portion for molding flange engagement, and means for attaching the fastener to a supporting panel.

16. A fastener for moldings having spaced inwardly extending flanges, said fastener comprising a one-piece member of spring sheet metal having a body portion adapted to lie substantially flat in applied position, oppositely disposed attaching fingers extending substantially vertically from said body portion, each finger being in the form of an elongate strip, one portion being integral with the body and extending upwardly therefrom and being bent upon itself to provide an outer downwardly extending portion with the free end in the region of said body portion, said outer portion inclining downwardly and outwardly and terminating in a downwardly and inwardly inclined portion for molding flange engagement, and means for attaching the fastener to a supporting panel, said attaching means including a pair of spaced legs integral with said body portion and projecting from the opposite side thereof, said legs being adapted to be inserted through an opening of a supporting panel, and stop means in the form of tongues struck out of said legs arranged to enable insertion of the legs into the openings but being engageable with the edge thereof to resist retrograde movement.

17. A fastener for moldings having spaced inwardly extending flanges, said fastener comprising a one-piece member of spring sheet metal having a body portion normally arched upwardly but adapted to lie substantially flat in applied position, oppositely disposed attaching fingers extending substantially vertically from said body portion, each finger being in the form of an elongate strip, one portion being integral with the body and extending upwardly therefrom and being bent upon itself to provide an outer downwardly extending portion with the free end in the region of said body portion, said outer portion inclining downwardly and outwardly and terminating in a downwardly and inwardly inclined portion for molding flange engagement, and means for attaching the fastener to a supporting panel, said attaching means including a pair of spaced legs integral with said body portion and projecting from the opposite side thereof, said legs being adapted to be inserted through an opening of a supporting panel, a pair of tongues struck out from the side edge portion of one leg, and a tongue struck out from an intermediate portion of the other leg, said tongues providing stop means for resisting retrograde movement of the fastener from the supporting panel.

HAROLD W. KOST.